(No Model.)  2 Sheets—Sheet 1.
R. WHEELER.
WHEEL HARROW.
No. 339,957. Patented Apr. 13, 1886.
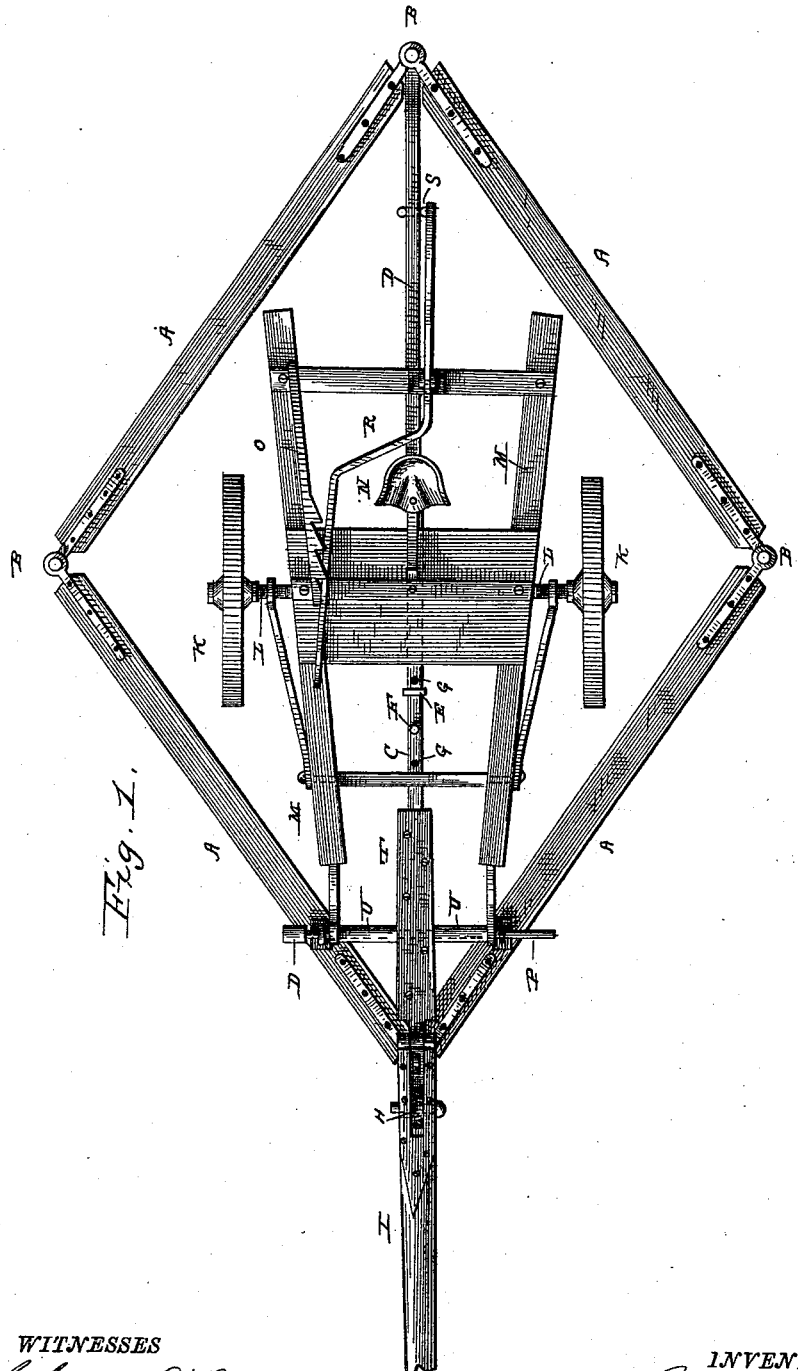
Fig. I.
WITNESSES
Chas. D. Davis
John C. Jenkins
INVENTOR
Robert Wheeler
By　　　　　
Attorney (No Model.) 2 Sheets—Sheet 2.
R. WHEELER.
WHEEL HARROW.
No. 339,957. Patented Apr. 13, 1886.
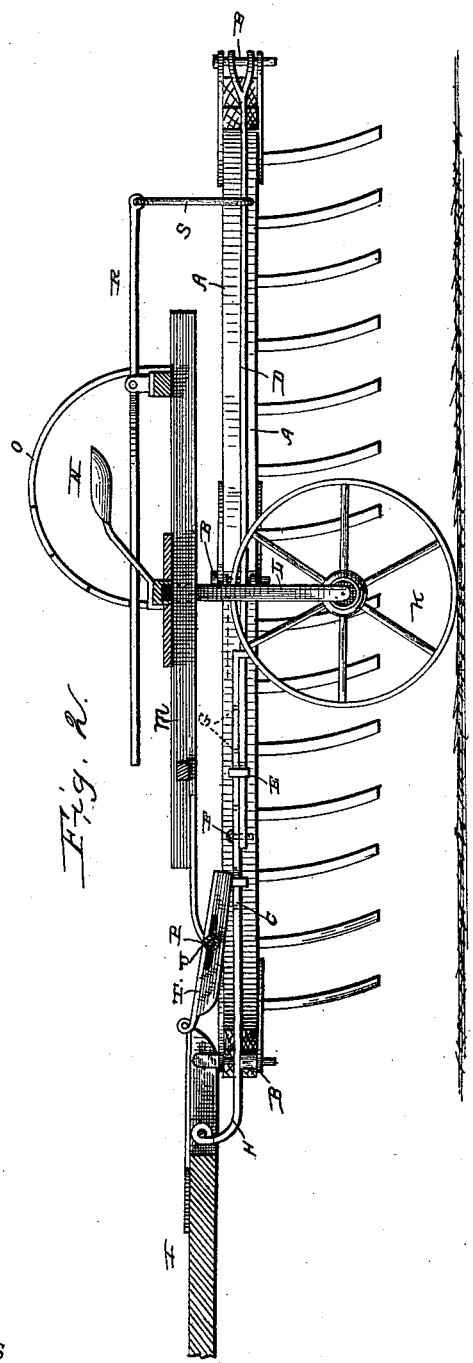
WITNESSES
Chas. H. Davis
John C. Jenkins
INVENTOR
Robert Wheeler
By C. W. H. Alexander
Attorney

UNITED STATES PATENT OFFICE.

ROBERT WHEELER, OF OKOLONA, MISSISSIPPI.

WHEEL-HARROW.

SPECIFICATION forming part of Letters Patent No. 339,957, dated April 13, 1886.

Application filed September 15, 1885. Serial No. 177,195. (No model.)

*To all whom it may concern:*

Be it known that I, ROBERT WHEELER, a citizen of the United States, residing at Okolona, in the county of Chickasaw and State of Mississippi, have invented certain new and useful Improvements in Wheeled Harrows, of which the following is a specification, reference being had therein to the accompanying drawings.

My invention relates to improvements in harrows, and is designed to produce a harrow that may be adjusted as to width or breadth, and also as to depth of cut, and also may be so elevated on its carriage or truck as to be readily transported from place to place.

In the drawings, Figure 1 represents a plan view of the device, and Fig. 2 a longitudinal section.

The harrow consists, primarily, of four tooth-carrying beams, A, secured together at the ends by hinge or pivot connections B, forming a frame in the form of a parallelogram, with the principal axis in the line of draft. Through the principal axis of the frame is a brace formed of two rods, C and D, connected, respectively, to the front and rear pivots of the frame, and having a sliding connection, one to the other, as shown at E, a bolt, F, and holes G being the means of adjusting the length of said brace. The front end of the brace is upturned, as at H, and forms a pivotal support for the tongue I. The truck is contained within the area of the frame, and consists of two wheels, K, and an arch-axle, L, on which is supported a frame, M. On this frame is supported the seat N and a rack-frame, O. The front of the frame M is pivotally connected to the harrow-frame by a rod, P, passing through eyes of the harrow-frame and the frame M.

To the rear of the frame M is pivoted a lever, R, the longer end of which engages normally with the rack-frame O, and the shorter end carries a pendent rod, S, having a hook at the free end, which hook engages under the rod D of the brace. The rear end of the tongue I is pivoted to a slotted piece, T, the rod P passing through said slot, and friction-rollers U on said rod retaining the said piece in a central position.

In Fig. 2 the device is shown in the elevated position ready for transportation. By elevating the front end of the lever the rear end of the harrow-frame will be lowered, while at the same time the weight of the said harrow-frame will carry the front of the truck-frame downward, the axle acting as a pivot, and thus lower the entire frame of the harrow to the ground or to any convenient depth of entrance therein. The pole, being pivoted, will adjust itself to the varying positions of the harrow and relieve the horses from undue strain. The slotted rear support of the pole adjusts itself to either the height or width adjustment of the harrow.

I claim—

The improved harrow described, consisting of a frame formed of tooth-carrying beams hinged together at the ends, combined with the adjustable longitudinal brace, the truck and frame thereon, the lever supporting the rear of the frame, and the pivotally-supported tongue adjusting itself by means of a slotted connection to the front pivotal support of the truck-frame, substantially as and for the purpose specified.

In testimony whereof I affix my signature in presence of two witnesses.

ROBT. WHEELER.

Witnesses:
W. G. OTT,
W. D. FRAZEE.